United States Patent Office
3,165,569
Patented Jan. 12, 1965

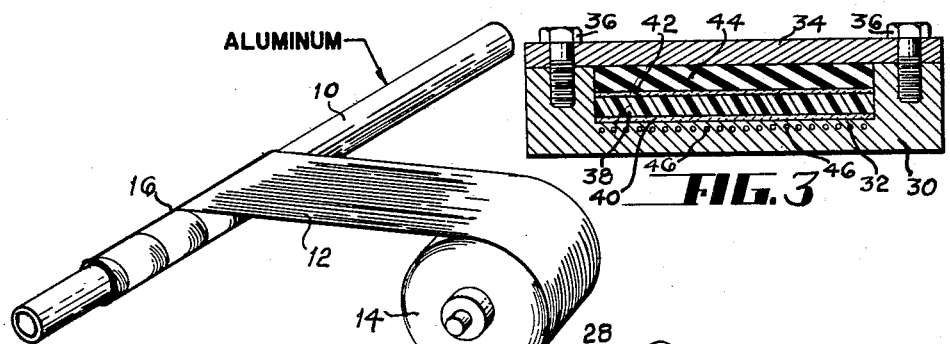
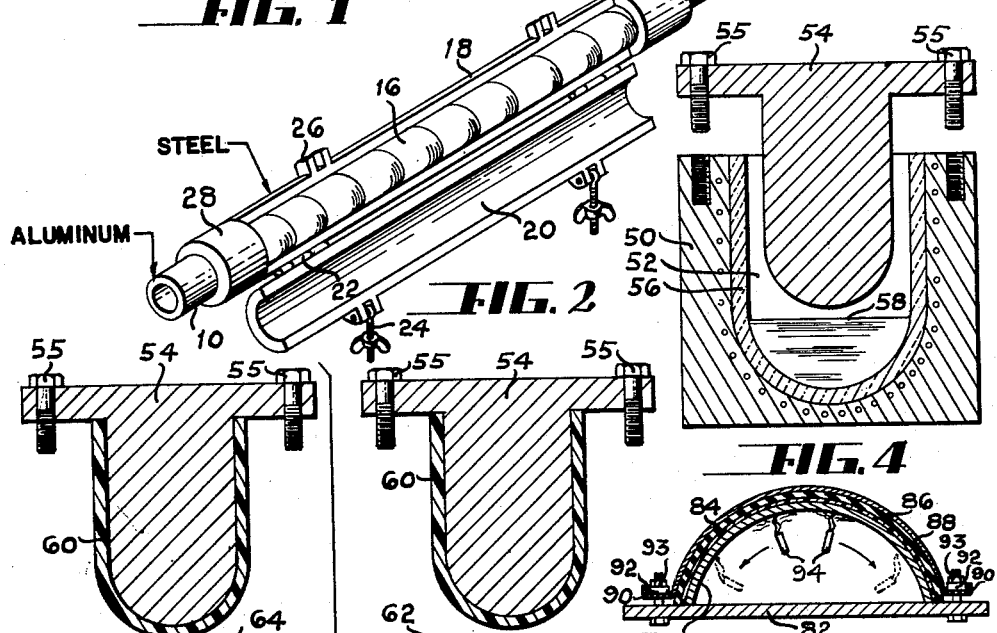
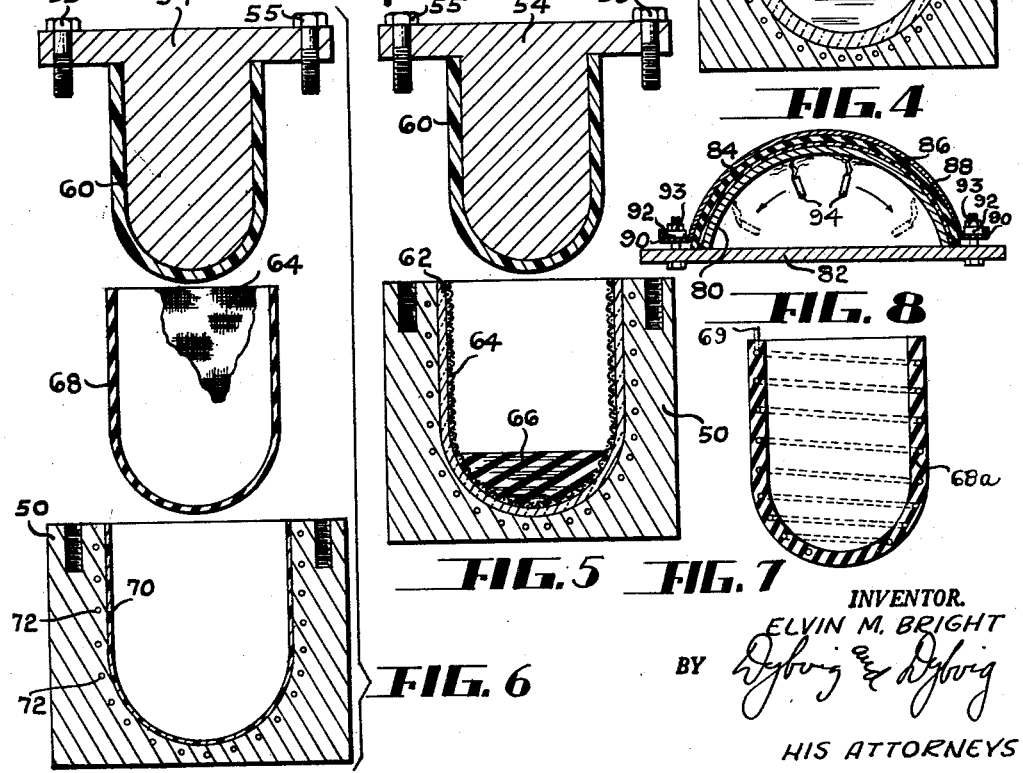

3,165,569
METHOD AND APPARATUS FOR THERMAL
EXPANSION MOLDING
Elvin M. Bright, North Hollywood, Calif., assignor to Air
Logistics Corporation, a corporation of California
Filed Apr. 18, 1960, Ser. No. 23,067
17 Claims. (Cl. 264—313)

This invention relates to a method and apparatus for molding wherein the differential thermal expansion of mold components is used to apply pressure to an object being molded. More particularly, this invention is directed to a method and apparatus for molding plastic products; however, the invention is not necessarily so limited.

In recent years, the laminated plastics industry has enjoyed a rapid growth, owing particularly to the development of improved combinations of plastic materials and reinforcing materials which enable the manufacture of exceptionally strong and durable laminated plastic parts. There has been a significant limitation to the development of these products, however, due to the fact that the size of laminated parts which can be manufactured is limited. Thus, the manufacture of large laminated parts, especially those with complicated curvatures, requires large and expensive matching mold members and correspondingly large presses. Where the part is large, it becomes economically infeasible to manufacture the part unless a great number of parts can be made, thereby distributing the costs of initial tooling over a large number of end products.

An object of the present invention is to provide a simple and economical molding method and apparatus for the manufacture of plastic parts.

Another object of the present invention is to provide improved molding apparatus utilizing differential thermal expansion of mold components to develop pressure in the mold, thereby eliminating the need for presses to operate the molds.

Still another object of the present invention is to provide a differential thermal expansion mold apparatus having a flexible thermally expansible mold component enabling the molding of complicated shapes with relatively simple equipment.

A still further object of this invention is to provide an improved method for molding plastic parts wherein differential thermal expansion of mold components is controlled by means of progressive heating of mold areas so as to expel gases from the mold as pressure is developed in the mold.

Other objects and advantages reside in the construction of parts, the combination thereof, the method of manufacture and the mode of operation, as will become more apparent from the following description.

In the drawings, FIGURE 1 is a perspective view illustrating one step in the preparation of a laminated plastic body for molding in a thermal expansion mold apparatus.

FIGURE 2 is a perspective view illustrating an assembled thermal expansion mold.

FIGURE 3 is a sectional view of a modified thermal expansion mold apparatus.

FIGURE 4 is a partially exploded sectional view illustrating one step in the preparation of a second modification of the mold apparatus of this invention.

FIGURE 5 is a partially exploded view in sectional detail illustrating another step in the preparation of the second modification.

FIGURE 6 is a partially exploded sectional view illustrating the assembly of the second modification for molding a plastic product.

FIGURE 7 is a sectional view of an improved thermal expansion element for use in the second modification.

FIGURE 8 is a sectional view of a third modification of the molding apparatus of this invention.

Referring to the drawing in greater detail, FIGURE 1 illustrates a mandrel 10 upon which a web 12 of plastic material is wound from a supply roll 14. The web 12 may comprise any suitable plastic material which can be molded with the application of heat and pressure. Thus, the web 12 may comprise a sheet of thermoplastic material, or a sheet of thermoplastic material reinforced with suitable reinforcing fibers.

A comparatively recent development in the plastics industry is the use of specially tailored thermosetting phenolic or epoxy resins in a hot-melt system. These resins, while in the unpolymerized state, are sufficiently viscous that they will form a self-supporting sheet when reinforced with glass fibers or similar reinforcement. As will become more apparent in the following description, the molding apparatus which is disclosed herein is particularly well suited to use in association with these thermosetting plastic sheet materials.

The winding process in FIGURE 1 results in the formation of a tubular plastic body 16 encircling the mandrel 10. When the web 12 has been reinforced with longitudinal glass fibers, the tubular body 16 will have glass fiber reinforcement traveling circumferentially in its walls. Where axial as well as circumferential reinforcement is desired, axially extending sheets of glass fiber reinforced plastic may be wound between successive layers of the web 12. The total number of layers of plastic material and the relative amounts of circumferential and axial reinforcement provided will vary depending upon the structural characteristics desired in the final molded product.

After the tubular body 16 is wound, the mandrel 10 is placed in a split hollow cylindrical mold 18, 20 as illustrated in FIGURE 2. The two semi-cylindrical mold members 18 and 20 are hinged together as illustrated at 22 and are adapted to be closed about the mandrel 10 with the aid of bolts 24 pivoted on the member 20 which anchor against suitable abutments 26 formed on the member 18. An annular dam 28 is slid over each end of the mandrel 10. These dams cooperate with the cylindrical mold members 18, 20 to confine the tubular plastic body 16.

The mold elements 10 and 18, 20 are constructed to expand differentially upon the application of heat thereto, the construction being such that the mandrel 10 expands more than the outer mold members 18, 20. To achieve this condition, the mandrel 10 is constructed of aluminum and the outer mold members 18, 20 are constructed of steel, which has a lower coefficient of expansion than the aluminum. It is to be understood, of course, that while aluminum and steel are employed advantageously in the practice of this invention, other metals with different coefficients of expansion may be substituted for the aluminum and steel.

The aluminum and steel mold members are so dimensioned that at room temperatures the steel outer mold snugly confines the tubular body 16. The parts are further dimensioned so that at the desired molding temperature, the aluminum mandrel 10 will have expanded sufficiently with respect to the steel outer mold members 18, 20 so that pressure is applied to the plastic body 16. The pressure ultimately applied to the plastic body depends, inter alia, upon the volume of the plastic body in relation to that of the mold cavity, the compressibility of the plastic, and its viscosity at the molding temperature. In the preferred practice of this invention, the dimensions of the mold members are adjusted experimentally until the pressure applied to the plastic body is within a range of acceptable molding pressures.

It will be apparent that once the aluminum and steel mold members have been adjusted to proper dimensions, the assembly may be heated to the desired molding temperature in any convenient manner, whereupon the differential thermal expansion of the mold members will operate to automatically apply the correct molding pressure to the plastic body 16. The mold assembly of FIGURE 2 thus eliminates the need for a press in the molding operation.

To minimize extrusion of plastic material laterally out of the mold along the interfaces between the mold members 18 and 20 and the dams 28, these dams are preferably constructed of the same material as the mold members 18 and 20 and so dimensioned that they will fit loosely on the mandrel 10 at room temperatures but will snugly engage the mandrel 10 at the molding temperature.

It has already been mentioned that the mold assembly of FIGURE 2 can be heated in any suitable manner. Thus, the assembly can be heated in an oven, or it can be heated by passing hot gases or steam through the interior of the mandrel 10. As will be discussed more fully in the following, it is sometimes preferable to commence heating of the mold assembly at the center thereof, such that the center reaches the ultimate molding temperature more rapidly than the ends of the mold. Through this technique, gases trapped in the mold are expelled outwardly from the center of the mold to the ends as the heating progresses.

FIGURE 3 illustrates a modified mold employing the differential thermal expansion principle. This mold comprises a base member 30 having a mold cavity 32 recessed therein. The mold cavity is closed with a cover member 34 secured with bolts 36. These mold members 30 and 34 are preferably formed with a structurally strong metal having a comparatively low coefficient of thermal expansion, such as steel. The mold is designed for compression molding thermoplastic or thermosetting plastic sheet materials.

In preparing for a molding operation, a plastic body 38 which is to be molded is sandwiched between a pair of caul sheets 40 and 42 in the mold cavity 32. The caul sheets 40 and 42 may be a silicone impregnated Dacron fabric, as one example. Depending upon the type of plastic material used it is frequently the case, however, that the silicone rubber does not adhere to the plastic material and caul sheets are unnecessary. The above sandwich is covered with a pad 44 of material having a high coefficient of thermal expansion in comparison to that of the base member 30.

While the pad 44 can be metal, such as aluminum, it is found preferable that the pad be a flexible materal such as silicone rubber.

Silicone rubber is used with particular advantage in the present invention, since it has an exceptionally high coefficient of thermal expansion. The linear coefficient of expansion for silicone rubber is in the order of $30 \times 10^{-5}$. By way of contrast, the linear coefficient of thermal expansion for plastic compounds such as phenol formaldehyde is in the range of $5 \times 10^{-5}$, and the linear coefficient of thermal expansion for steel is only about $1 \times 10^{-5}$.

In addition to having a high coefficient of thermal expansion, the silicone rubber is resilient and thereby capable of applying a uniform molding pressure to the plastic body. This characteristic is particularly important when molding plastic bodies that have been reinforced with glass fibers or similar materials. Thus, the reinforcing material sometimes forms localized "high spots" in the plastic body which resist the application of pressure and thereby shield adjacent portions of the plastic body from the molding pressure. The yieldable nature of the silicone rubber pad substantially eliminates this problem.

As was the case with the embodiment of FIGURES 1 and 2, the pad 44 and the plastic body 38 are so dimensioned with reference to the size of the cavity in the base member 30 that they will expand to develop the desired molding pressure at the prescribed molding temperature.

It should be recognized, of course, that the mold apparatus of FIGURE 3 utilizes the volume expansion of both the silicone rubber pad 44 and the plastic body 38. This is in contrast to the mold apparatus of FIGURES 1 and 2 which essentially utilizes only the linear thermal expansion characteristics of the aluminum and steel mold components.

FIGURE 3 illustrates mold members 30 and 34 which are constructed of the same materials. It is to be understood, however, that this is not a necessary condition. The essential components of a mold assembly for practicing the present invention are (a) spaced wall portions (upper and lower surfaces of the cavity 32) and (b) supporting means (side walls of the cavity 32) securing the wall portions in fixed relation. When comparatively thin sheet materials are to be molded, lateral extrusion of the plastic materials is frequently no problem and it is sufficient if the confining wall portions of the mold resist enlargement of both the plastic body and the adjacent thermally expansible mass in the direction normal to the interface therebetween. Insofar as thermal expansion of the mold members is concerned, it is only important that the thermal expansion of the supporting means for the spaced wall portions be less than that of the thermally expansible mass confined between the wall portions.

For the purpose of heating the mold apparatus of FIGURE 3, the base member 30 may be provided with electrical heating elements such as illustrated schematically at 46. In a preferred manner of heating this mold apparatus, the heating elements 46 are connected sequentially to a source of electrical energy so that the central portion of the apparatus is heated first and the edges of the mold cavity 32 are the last to be brought up to molding temperature. By this means, air and other gases trapped in the mold cavity are first expelled from the central portion of the mold cavity and progressively forced out to the edges of the mold cavity.

FIGURE 3 illustrates a unitary plastic body 38 placed within the mold apparatus. It is to be understood, however, that the apparatus of FIGURE 3 can also be used to laminate several sheets of plastic material which may be cross-plied or parallel-plied depending upon the structural characteristics desired.

FIGURES 4, 5 and 6 illustrate adaptation of the differential thermal expansion molding process to the fabrication of curved plastic parts without a press. FIGURE 4 illustrates a mold member 50 provided with a cavity 52 having a general U-shaped cross section. This cavity is used to determine the ultimate exterior shape of a molded plastic part and to this end, the walls of the cavity 52 may be carefully finished so that they will apply a correspondingly accurate finish to the exterior surface of the molded product.

FIGURE 4 also illustrates a plug 54 providing a core for the interior of the cavity 52. The plug 54 is provided with bolts 55 with which it can be secured firmly to the mold member 50. The plug in the cavity 52 operates to provide a mold cavity capable of forming a thin walled plastic body which could be the nose cone of a missile, as one example. As will become apparent from the description which follows, it is unnecessary to accurately finish the surface of the plug 54.

In order to prepare the mold apparatus of FIGURE 4 for forming the desired end product, the mold cavity 52 is lined with beeswax or another suitable filler material. The thickness of the beeswax liner 56 corresponds to the thickness of the desired plastic product plus the thickness of a silicone rubber pad which is to be formed in the mold cavity. With the beeswax liner in place, the cavity 52 is partially filled with a thermosetting plastic material 58 catalyzed to cure at room temperatures. The plug 54 is then lowered into position, displacing the plastic material upwardly in the cavity 52 and forcing excess plastic material out of the mold cavity. The plastic material within the cavity is then permitted to cure at room temperature and form an adhesive bond with the plug 54.

After the plastic material 58 has cured, the plug 54 with the plastic adhered thereto is removed. As illustrated in FIGURE 5, the plastic material forms a liner 60 for the plug 54. To further prepare the mold apparatus, a new beeswax liner 62 is placed in the mold cavity 52. This new liner is given a thickness which corresponds to the desired thickness in the ultimate molded product. Thus when the plug 54 is lowered into position within the mold member 50, the annular space between the plastic liner 60 on the plug 54 and the beeswax liner 62 on the mold member 50 corresponds to the desired thickness of a silicone rubber pad which is to be molded in situ.

In comparison to other rubber-like materials, silicone rubber has a comparatively low tensile strength. Accordingly, in constructing a pad for molding large parts of the type contemplated with the mold apparatus of FIGURES 4–6, it is desirable to reinforce the silicone rubber pad. FIGURE 5 illustrates an open weave fabric 64 placed in the mold cavity for this purpose. As one example, this fabric may be nylon, which is preferably in the form of a woven jersey or knit weave permitting at least two-way elongation within the fabric.

While not illustrated, this fabric is preferably pre-coated with a thin film of silicone rubber to insure that none of the nylon is exposed at the surfaces of the silicone pad ultimately to be constructed.

With the nylon fabric liner 64 in place, a quantity of silicone rubber material 66 catalyzed to set at room temperatures is poured into the mold cavity 52 and the plug 54 is lowered into position. Silicone rubber material obtained from the Dow Chemical Company of Midland, Michigan under the trade name Silastic RTV 502, catalyzed with stannous oxalate performs satisfactorily in the present apparatus. As the plug 54 moves into position, the silicone rubber is displaced upwardly in the mold cavity 52, any excess being displaced out of the mold apparatus. The silicone rubber is then permitted to set at room temperature to form a pad 68. After the silicone rubber has set, the mold is disassembled and the beeswax liner 62 removed.

Preferably, the liner 60 on the plug 54 and the silicone rubber pad 68 are incompatible so that the pad does not adhere to the liner 60. This enables the plug 54 and the pad 68 to be handled independently. The importance of this feature will become more apparent in the following when techniques for disassembling the mold after fabricating an end product are discussed.

FIGURE 6 illustrates utilization of the mold apparatus in the fabrication of an end product. For this purpose, uncured plastic sheet stock 70 which may or may not be reinforced with a suitable fibrous material is laid up in the mold cavity 52 to build up the desired wall thickness of the molded product. For this purpose, several sheets of the plastic stock may be laminated together. The silicone rubber pad 68 is then carefully lowered into position followed by the plug 54 which is bolted securely to the mold member 50. Upon heating of the assembled mold to the desired molding temperature, the silicone rubber pad 68, together with the plastic liner 60 and the plastic lay-up, will expand to apply pressure to the lay-up.

As with the embodiments previously discussed, any suitable means may be employed to supply heat to the mold apparatus. One means is illustrated in FIGURE 6. This comprises a plurality of heating elements 72 positioned in the mold member 50. It is preferable to supply electrical power to these heating elements in sequential relation so that the bottom of the mold reaches the molding temperature first and the upper ends of the mold reach the molding temperature last. This causes any air and other gases trapped in the mold to be forced progressively out of the upper end of the mold.

Where high production moldings are required, it is sometimes desirable to control the expansion and contraction of the silicone pad by separate means. One such means is illustrated in FIGURE 7, which shows a rubber pad 68a formed about a coil 69. The coil 69, which may be of metal or plastic construction and is preferably flexible, is formed of tubular material so that water or another fluid may flow therethrough. By this means, a hot fluid may be used to expand the pad 68a or a cold fluid may be used to contract the pad. As one example, the coil 69 may comprise a nylon sleeving material.

The internal heating of the pad 68a permits simplified heating of large molds and furthermore permits utilization of the expansion characteristics of the silicone rubber with maximum efficiency. Thus, it is only necessary to heat the silicone pad and, by conduction, the adjacent plastic layer to accomplish the molding operation.

It will be noted that the plastic liner 60 for the plug 54 is ordinarily a material of low heat conductivity. Depending upon the type of heating employed, it is sometimes desirable to increase the thermal conductivity of the plastic liner 60. This may be done by loading the plastic liner with aluminum powder or a similar substance.

In disassembling the mold after completion of the molding operation, the plug 54 is first removed. For this purpose it is necessary that the plug 54 separate freely from the silicone rubber pad, as described previously. Next, the rubber pad 68 is collapsed within the mold cavity 52 to separate it from the molded article and removed. Thereafter, the finally molded article is free for removal from the mold cavity 52.

As was the case with the embodiment of FIGURE 3, the use of caul sheets is optional. In molding articles of complicated shapes, however, the use of caul sheets is frequently desirable for the reason that the formation of a flash at the edges of the molded product is generally unavoidable and the silicone rubber pad is easily damaged by contact with the sharp edges of the flash. The provision of caul sheets between the silicone rubber pad and the molded plastic article alleviates this problem.

FIGURE 8 illustrates a third embodiment of the present invention. This embodiment is designed for the manufacture of large curved sheets of plastic material. The mold apparatus comprises a rigid base member 82 which supports an arcuate rigid inner mold member 80. Wrapped about the inner mold member 80 is a flexible sheet metal outer mold member 88 having channel portions 90 formed in the opposite ends thereof. A rigid beam 92 is nested in each of the channel portions 90. Bolts 93 passing upwardly through the base member 82 through the channel portions 90 and through the rigid beams 92 are utilized to draw the sheet metal member 88 tightly about the inner mold member 80.

In operating this mold apparatus, a plastic material 84 is laid upon the inner mold member 80 and covered with a silicone rubber pad 86. Next, the sheet metal outer mold member is drawn tightly over the silicone pad 86. The apparatus is then ready for an application of heat to complete a molding operation.

The heat may be supplied by any suitable means. However, FIGURE 8 illustrates a preferred means wherein gas burners 94 are mounted adjustably in the interior of the inner mold member 80. The permitted adjustment of the gas burners is such that they may be placed initially at the top of the mold member 80 and worked gradually along the sides of the mold member 80 to the bottom thereof, as illustrated in phantom detail in FIGURE 8. This enables air and other gases trapped in the mold assembly to be expelled first from the top of the mold assembly and forced gradually out from the bottom of the mold assembly.

As this mold assembly is brought up to the desired mold temperature, the silicone rubber pad expands to apply pressure to the plastic material laid upon the rigid mold member. The mold pressure ultimately attained is adjustable through adjustment of the bolts which secure the sheet metal mold member 88 in place.

As was the case with the embodiment of FIGURE 1, suitable dams, not shown, may be placed along the sides of the sheet metal mold member 88 to confine the plastic within the mold.

The apparatus of FIGURE 8 is particularly suited to the molding of glass fiber reinforced thermosetting plastic sheet material. With sheet materials of this type, it is found that the glass fibers retard extrusion of the plastic material laterally out of the mold during the cure process, hence dams may be omitted.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. The method of forming a tubular body from a sheet of plastic material comprising the steps of wrapping the sheet material about a thermally expansible mandrel, confining the mandrel with the sheet material thereon within an annular mold fabricated of material having a lower thermal expansion than that of said mandrel, and supplying heat to said mandrel and by conduction to the plastic material to induce thermal expansion thereof with consequent application of pressure to said plastic material.

2. The method according to claim 1 wherein said plastic material comprises a thermosetting plastic and wherein the heat supplied thereto is sufficient to polymerize the material at the pressure attained.

3. The method of forming a tubular body from a moldable material comprising the steps of placing the material about a thermally expansible mandrel, confining the mandrel with the moldable material thereon in an annular mold fabricated of a substance having a lower thermal expansion than that of said mandrel, and supplying heat to said mandrel to induce thermal expansion thereof with consequent application of pressure to said moldable material.

4. The method of molding comprising the steps of placing a moldable material adjacent one surface of a thermally expansible mass, positioning said moldable material and said mass upon a substantially rigid convexly curved mold member, pulling a substantially unstretchable sheet tightly over said moldable material and said mass, anchoring the opposite ends of said sheet fixedly with respect to the rigid mold member to sandwich said moldable material and said mass between said sheet and said rigid mold member, and applying heat to said mass to induce thermal expansion thereof with consequent application of pressure to said moldable material.

5. The method according to claim 4 wherein said thermally expansible mass comprises a pad of silicone rubber material.

6. The method of molding by application of heat comprising the steps of placing an article to be molded adjacent a thermally expansible mass having a self-supported shape of its own under the molding temperature conditions, confining the article and the adjacent mass in a mold having a coefficient of thermal expansion lower than that of said mass, and supplying heat to said mass whereby the thermal expansion of said mass will result in application of pressure to said article.

7. The method of applying pressure to an element by application of heat comprising the steps of placing the element adjacent a thermally expansible mass having a self-supported shape of its own under the temperature conditions producing the pressure application, sandwiching said element and said mass between rigid confining wall portions supported in spaced relation by means having a lower coefficient of thermal expansion than said mass, and supplying heat to said mass to induce thermal expansion thereof with consequent application of pressure to said element.

8. The method of molding a plastic body by application of heat comprising the steps of placing plastic material adjacent a thermally expansible flexible pad having a self-supported shape of its own under the molding temperature conditions, confining the pad and the plastic material between spaced wall portions at least one of which is contoured to provide the ultimate shape of the plastic body, securing said wall portions in fixed relation by means having a coefficient of thermal expansion less than that of said pad, and applying heat to the flexible pad to induce thermal expansion of said pad with consequent application of pressure to said plastic material.

9. The method according to claim 8 wherein said pad comprises silicone rubber.

10. The method of forming a plastic article by application of heat comprising the steps of placing the article adjacent a thermally expansible mass having a self-supported shape of its own under the temperature conditions producing the pressure application, confining said mass and said article in the cavity of a rigid mold fabricated with material having a lower thermal expansion than that of said mass, and supplying heat to said plastic article and said mass to induce thermal expansion thereof with resultant application of pressure to said plastic article.

11. The method of forming a plastic article by application of heat comprising the steps of placing the article adjacent a thermally expansible mass having a self-supported shape of its own at the forming temperature, confining said mass and said plastic article in the cavity of a mold fabricated with rigid material having a lower thermal expansion than that of said mass, and supplying heat to said mold and by conduction to said mass and said plastic material with resultant application of pressure to said plastic material.

12. The method of polymerizing a thermosetting plastic article with the application of heat and pressure comprising the steps of placing the plastic article adjacent a flexible thermally expansible body having a self-supported shape of its own under the molding temperature conditions, sandwiching said body and said plastic article between wall portions supported in fixed spaced relation by means having a thermal expansion lower than that of said body, and supplying heat to said body and said plastic material to induce thermal expansion of said body and ultimate application of polymerizing heat and pressure to said plastic article.

13. The method of temporarily applying pressure to an element by application of heat comprising the steps of placing a surface of the element adjacent the surface of a flexible thermally expansible mass having a self-supported shape of its own under the temperature conditions producing the pressure application, temporarily securing said element and said mass against any substantial enlargement in a direction normal to the adjacent surfaces by rigid means having a coefficient of thermal expansion less than that of said mass, and supplying heat to the mass to induce thermal expansion thereof with consequent application of pressure to said body.

14. The method of molding comprising the steps of placing a moldable material in contact with a unified thermally expansible body, confining the moldable material and the body between spaced wall portions, applying heat to said body and, by progressively advancing the application of heat along said body, causing said body to expand progressively across its area of contact with said moldable material whereby gases entrapped between said moldable material and said body are forced progressively out of the area of contact therebetween, said body expanding under the application of heat thereto to apply pressure to said moldable material.

15. The method according to claim 14 wherein said thermally expansible body comprises a pad of silicone rubber.

16. Apparatus for molding by application of heat comprising a plurality of mold elements, means securing said elements in fixed relation to provide a cavity having a thickness greater than that of the object to be molded, and a thermally expansible mass having a self-supported shape of its own under the molding temperature conditions disposed within said cavity and cooperating with the walls thereof to form a mold chamber for receiving a material to be molded, said thermally expansible mass having a coefficient of thermal expansion exceeding that of said mold elements whereby application of heat to said mass will cause a reduction in the size of said mold chamber with consequent application of pressure to material placed therein.

17. Apparatus for molding comprising a plurality of rigid mold elements, means securing said elements in fixed relation to provide a cavity having a thickness greater than that of the object to be molded, and a silicone rubber pad disposed within said cavity cooperating with the walls of said cavity to provide a mold chamber for receiving a material to be molded, said silicone rubber pad having a coefficient of thermal expansion exceeding that of said mold elements whereby application of heat to said pad will cause a reduction in the size of said mold chamber with consequent application of pressure to material placed therein.

References Cited in the file of this patent

UNITED STATES PATENTS

| | | |
|---|---|---|
| 878,513 | Emerson | Feb. 11, 1908 |
| 2,250,325 | Barnes | July 22, 1941 |
| 2,260,134 | Ballman | Oct. 21, 1941 |
| 2,298,037 | Crandell | Oct. 6, 1942 |
| 2,363,213 | Wallace | Nov. 21, 1944 |
| 2,367,779 | Hull | Jan. 23, 1945 |
| 2,406,843 | Luth et al. | Sept. 3, 1946 |
| 2,417,090 | Silk et al. | Mar. 11, 1947 |
| 2,458,864 | Lindsay | Jan. 11, 1949 |
| 2,476,283 | Castellan | July 19, 1949 |
| 2,478,165 | Collins | Aug. 2, 1949 |
| 2,517,701 | Oettinger | Aug. 8, 1950 |
| 2,636,776 | Vernet | Apr. 28, 1953 |
| 2,673,371 | Uhlig | Mar. 30, 1954 |
| 2,783,173 | Walker et al. | Feb. 26, 1957 |
| 2,815,534 | Ising et al. | Dec. 10, 1957 |
| 2,945,262 | Petty | July 19, 1960 |
| 2,947,596 | Barsy | Aug. 2, 1960 |

FOREIGN PATENTS

| | | |
|---|---|---|
| 771,236 | Great Britain | Mar. 27, 1957 |